United States Patent
Pering et al.

(10) Patent No.: US 7,174,462 B2
(45) Date of Patent: Feb. 6, 2007

(54) METHOD OF AUTHENTICATION USING FAMILIAR PHOTOGRAPHS

(75) Inventors: Trevor A. Pering, Mountain View, CA (US); John J. Light, Beaverton, OR (US); Roy Want, Los Altos, CA (US); Muralidharan Sundararajan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 10/293,007

(22) Filed: Nov. 12, 2002

(65) Prior Publication Data

US 2004/0093527 A1 May 13, 2004

(51) Int. Cl.
*H04L 9/32* (2006.01)
(52) U.S. Cl. .............................. 713/182; 713/168; 726/2
(58) Field of Classification Search ................. 713/168, 713/182; 726/2
See application file for complete search history.

(56) References Cited

U.S. PATENT DOCUMENTS

| | | | |
|---|---|---|---|
| 5,559,961 A | | 9/1996 | Blonder |
| 6,192,478 B1 | * | 2/2001 | Elledge ........................ 726/18 |
| 2002/0029341 A1 | * | 3/2002 | Juels et al. .................. 713/184 |
| 2004/0030934 A1 | * | 2/2004 | Mizoguchi et al. ......... 713/202 |

FOREIGN PATENT DOCUMENTS

WO    WO 02/33882    *    4/2002

OTHER PUBLICATIONS

"Passface instead of Password", The Hindu, online edition of India's National Newspaper, Business Section, Jan. 10, 2002.*
Alexandria Robbins, "Face it", PC Magazine, Jun. 12, 2001.*
Jermyn et al., "The Design and Analysis of Graphical Passwords," Proceedings of the 8th USENIX Security Symposium, USENIX Association, Aug. 23-26, 1999, pp. 1-15, Washington, D.C., USA.
Dhamija et al., "Deja Vu: A User Study Using Images for Authentication," Proceedings of the 9th USENIX Security Symposium, USENIX Association, Aug. 14-17, 2000, pp. 1-15, Denver, Colorado, USA.
"PKI and Passfaces—Synergistic or Competitive?," Real User Personal Authentication Online, Real User Corporation, Oct. 2001, pp. 1-14, Washington, D.C., USA.

* cited by examiner

*Primary Examiner*—Taghi T. Arani
(74) *Attorney, Agent, or Firm*—Steven P. Skabrat

(57) ABSTRACT

Authenticating a user operating an un-trusted access device includes causing the display, on the un-trusted access device, of a plurality of photographs to the user, at least one of the photographs being from the user's personal photograph collection and already familiar to the user, remaining photographs being decoy photographs, accepting an input selection from the user identifying one of the displayed photographs, and allowing access when the user's selection correctly identifies a sequence of displayed photographs from the user's photograph collection. No user training prior to using the authentication system is needed and no pre-selection of a password or photograph is necessary.

28 Claims, 3 Drawing Sheets

METHOD OF AUTHENTICATION USING FAMILIAR PHOTOGRAPHS

BACKGROUND

1. Field

The present invention relates generally to computer security and, more specifically, to recognition-based authentication.

2. Description

User authentication is a central component of currently deployed computer security infrastructures. User authentication involves determining if the person attempting to gain access to a system is indeed a person authorized for such access. There are three main techniques for user authentication: 1) knowledge-based systems, which involve allowing access according to what a user knows; 2) token-based systems, which involve allowing access according to what a user possesses; and 3) biometrics-based systems, which involve allowing access according to what the user is. Although biometrics can be useful for user identification, one problem with these systems is the difficult tradeoff between imposter pass rate and false alarm rate. In addition, many biometric systems require specialized devices, which may be expensive. Token-based schemes are problematic if the token is misplaced or stolen. Most token-based authentication systems also use knowledge-based authentication to prevent impersonation through theft or loss of the token. An example is automated teller machine (ATM) authentication, which requires a combination of a token (e.g., a bank card) and secret knowledge (e.g., a personal identification number (PIN)). For these and other reasons, in today's computer systems knowledge-based techniques are predominantly used for user authentication.

Despite their wide usage, textual passwords and PINs have a number of shortcomings. Many users forget their passwords and PINs. Simple or meaningful passwords are easier to remember, but are vulnerable to attack. Passwords that are complex and arbitrary are more secure, but are difficult to remember. Since users can only remember a limited number of passwords, they tend to write them down or will use similar or even identical passwords for different purposes. This of course weakens the security of systems used with the passwords. In addition, some systems may be vulnerable to a keystroke-saving program or device. Such a technique may be used surreptitiously to capture the inputting of the password by the authorized user in order to facilitate subsequent unauthorized access by another.

One approach to improve user authentication systems is to replace the precise recall of a password or PIN with the recognition of a previously seen image, a skill at which humans are remarkably proficient. In general, it is much easier to recognize something than to recall the same information from memory without help. Experiments show that humans can remember and recognize hundreds to thousands of pictures in fractions of a second of perception. By replacing precise recall of the password with image recognition, the cognitive load on the user during authentication can be lessened, helping the user to make fewer mistakes.

Existing techniques use recognition of graphical images as an authentication mechanism. One system called "Passface", available from Real User Corporation, provides authentication through the recognition of human faces. In another system described in "Déjà vu: A User Study Using Images for Authentication" by Rachna Dhamija and Adrian Perrig, Proceedings of the 9$^{th}$ Usenix Security Symposium, August, 2000, authentication is performed through the ability of a user to recognize previously seen images. In this system, the images are randomly generated artwork. However, both of these systems have at least several disadvantages. The systems require a portfolio creation phase to generate and/or select the images to be used as the "correct" answers in a challenge-response scenario during authentication. The systems also require a training phase wherein the user studies the images (either human faces or random art) selected to be the user's "correct" images. The user is required to memorize the images so as to be able to recognize them later during an authentication session. The portfolio creation phase and the training phase may be difficult to implement in some usage scenarios. Furthermore, these systems are likely susceptible to capture-and-replay attacks, just like traditional text passwords.

New techniques are needed which overcome the deficiencies of the prior art to provide an easy to use, secure authentication system based on recognition of images. Such techniques should allow for recognition-based authentication without lengthy, prior training sessions by the user.

BRIEF DESCRIPTION OF THE DRAWINGS

The features and advantages of the present invention will become apparent from the following detailed description of the present invention in which.

DETAILED DESCRIPTION

Figure 1:
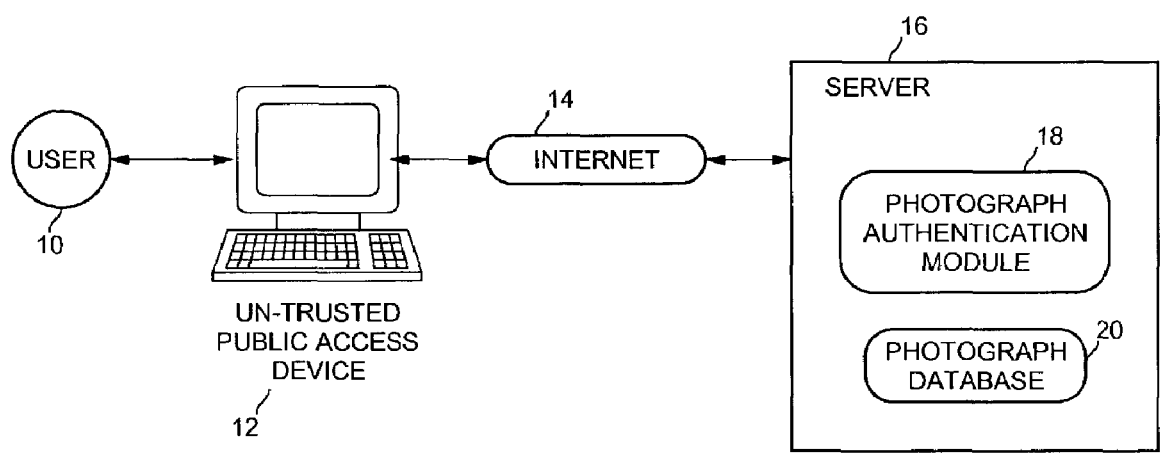
FIG. 1 is a diagram of a system supporting authentication using familiar photographs according to an embodiment of the present invention.

Photographic authentication is a technique based on personal photograph collections used for logging in through un-trusted terminals, such as the web access points in an Internet café or airport lounge. At this point in time, there are two technology trends that make this possible: the availability of public Internet access points and digital photography. Public access points are a convenient method for accessing the Internet but they pose a considerable security risk because an unscrupulous attacker could modify the system to monitor all of a user's actions on that terminal. Meanwhile, the emergence of digital photography is yielding fairly large personal photography collections, which are easily recognizable by their owners. Embodiments of the present invention authenticate users by requiring them to identify a few random samples taken from a large collection of all their photographs. Although not as mathematically secure as multi-character "strong" passwords, this technique is resistant to replay attacks because it uses a different subset of pictures for each login attempt. Embodiments of the present invention may provide a viable technique for authentication through un-trusted terminals, keeping in mind that it may not be appropriate for all kinds of information access.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Public Internet access points, such as those found in airports, libraries, Internet cafés, and hotels, provide convenient, social, and economical access to the web, although at an increased security risk. While currently relatively limited in the United States, public access points are very popular in Europe and other locales where they provide the main means of Internet access. However, while convenient, these access points represent a security risk because they are out of the control of the patron (e.g., Internet user), and even the proprietor (e.g., caféowner). For example, it would be relatively easy for an individual to walk into most Internet cafés and insert a small device, between the keyboard and main computer that captures all of the user's keystrokes. Furthermore, once this technique has been used to capture a text-based password, that same password can be used, unaltered, to re-login to the same website and possibly others, at any time.

One advantage of photographic authentication is that it is resilient to replay attacks: the results from one login sequence cannot be simply replayed to repeat authentication. Most current authentication techniques assume a trusted endpoint, i.e., the terminal access point, and only protect against unscrupulous networks, an assumption that is not always valid. By presenting different images from a large corpus of personal photographs, a photographic authentication system can mitigate the effectiveness of replay attacks, i.e., the captured results from one login session are not sufficient to repeat the authentication process. Another advantage is that the present invention requires no training (remembering personal photographs requires no effort for the majority of people), and therefore is very easy to use.

This authentication technique works in conjunction with a network accessible trusted "home" server that stores the user's photographs and account information. First, the user identifies himself or herself to the system and initiates an authentication request to the "home" server. After successful authentication, the home server would pass the necessary account information and credentials to a desired web-service host. Because the home server maintains the sensitive information, the access terminal does not a-priori gain access to any unnecessary information, such as web-service account numbers or the photographic database.

The primary motivation for photographic authentication is the need for more secure login mechanisms through un-trusted terminals, and it is strongly supported by the increased presence of digital photography and the ease that people can recognize images. In addition to present-day Internet cafés, emerging mobile usage models will rely more heavily on public infrastructure, increasing the need for alternative authentication techniques. Independently, the use of (non-personal) images for authentication, rather than traditional text passwords, is interesting because they are easier to remember and potentially more secure than text. However, these graphical techniques still assume a trusted access terminal, which may not be appropriate, depending on the usage scenario.

One potential risk with using public infrastructure is that an assailant can potentially capture all information being entered and displayed, not just the authentication process, limiting suitable content to information that is not high-security. For example, when a user wishes to check the status of their bank account, it is generally only necessary to display the account balance, not the more sensitive combination of account number and balance. Such casual information, which is private but not high-security, can be suitably protected by a photographic authentication scheme. Furthermore, a highly secure authentication technique may be overkill for use on an un-trusted terminal, because secure authentication in itself does not guarantee the security of the data accessed through the terminal. Photographic authentication aims to be "secure enough" for casual data by providing the necessary level of security without compromising ease-of-use. Ideally, the complete system would not even allow a user to access high-security data through an un-trusted terminal.

The popularity of digital photography has grown due to the widespread availability of affordable consumer-grade cameras and computers capable of manipulating photographs. Because of this, many people have substantial personal digital photograph collections. Furthermore, as cameras become more affordable and easier to use, more and more people will possess very large personal image collections. Similarly, storage capacities are rapidly increasing, providing ample space to save all of a person's images. For the users that have them, these images form a convenient base for a zero-configuration authentication system.

In one embodiment, no manual filtering or editing of the user-provided image sets need be performed. User's images may be simply copied from their pre-existing private collection, a process that is fundamentally different from schemes in which the user must create and remember their password. Many photographs in personal photograph collections may be visual duplicates, unrecognizable, or contain very easy-to-recognize features, such as the user. (In one embodiment, these undesirable images may be filtered out, requiring up-front processing but not requiring the user to remember any configuration details.

One known login technique for un-secure terminals would be to require users to carry a portable electronic device, such as a personal digital assistant (PDA) or SecurID card, as a trusted authentication mechanism enabling them to safely log-in to an un-trusted terminal using a one-time key generated by the device. Although attractive from a security point-of-view, it is quite complicated from a user's perspective: they have to retrieve the device, activate it, and then manually type in the appropriate code. Additionally, they have to manage not to forget, lose, or break the device. In comparison, photographic authentication is streamlined: the user walks up to a terminal and selects a few images presented to them on the screen.

Three trust classifications for access terminals provide a framework for understanding the context and security of public terminals: 1) fully-trusted; 2) semi-trusted; and 3) un-trusted. Fully-trusted terminals are physically secure and controlled by a trusted party. These include home and work machines, and those controlled by friends, coworkers, etc. In these cases, user can assume that no covert modifications have been made to the system. Semi-trusted terminals are controlled by a known party, but still susceptible to modification by attackers. These include public-access terminals, e.g., in the local Internet café, that either belong to a well-know chain or are repeatedly visited by the user, indicating some level of trust placed in the establishment. Un-trusted terminals are controlled by an unknown party in an unfamiliar space. These include public-access terminals that are visited only once by the user and used out of necessity, such as in an airport or foreign city (e.g., "I need to check my calendar right now and this is the only available access point").

Photographic authentication is designed to provide access to un-trusted terminals, which are premised on the "single visit" usage model where a user gives up very limited information because they only visit the terminal once. Semi-trusted terminals, which imply repeated visits, potentially reduce the security benefits by increasing the amount of information available to an attacker, counterbalanced by the increased trust placed in the establishment implied by repeated visits. Photographic authentication is potentially beneficial, although not necessary, in fully-trusted environments because it is would be easier to use than text-based authentication. In any case, photographic authentication is not a strict replacement for other techniques but instead provides a first-round of authentication for access to some kinds of data. Similarly, this system is only designed to prevent "acute" attacks, which target any user logging into the compromised terminal, and not "conspiracy" attacks, which target a specific user, regardless of the access terminal(s) used.

There is a fundamental difference between knowledge-based authentication systems, such as text passwords, and recognition-based ones, such as photographic authentication. Password systems use a unique piece of knowledge, i.e., the password, to perform the authentication process, while recognition uses a challenge-response sequence, i.e., selecting one image from a challenge set. This characterization is similar to the underlying security mechanisms used for logging into remote computers over a potentially insecure network: the remote system challenges the local system, which forms a response using the local knowledge. Although still based on passwords, the knowledge itself never leaves the secure access terminal. Changing this model so that the endpoint is un-trusted, i.e., a public access terminal, highlights the need for a true end-to-end challenge-response, where the final end-point is the user instead of the machine.

An embodiment of the present invention is a photographic recognition-based authentication technique based on using personal photograph collections for logging in to web sites, such as a user's bank account or home page, through un-trusted terminals. The un-trusted terminals may be located in public web access points such as an Internet cafe or an airport lounge. Embodiments of the present invention allow a user to login to a web site or network by correctly recognizing a sequence of personal photographs displayed amongst a plurality of decoy photographs. The present invention is resistant to replay attacks because it uses a different subset of photographs for each login attempt. Location-based information may also be used by the authentication system in determining the level of security to be provided during the authentication process.

FIG. 1 is a diagram of a system supporting authentication using familiar photographs according to an embodiment of the present invention. A user 10 desires to login to a secure network or web site. In one embodiment, the user may be situated in a public place having an un-trusted public access device 12. The public place may be a coffee shop, a bookstore, an airport lounge, a hotel lobby, a library, a mall, or any other public establishment. In other embodiments, the device may be trusted by the user. The public access device may comprise a personal computer (PC), a computer terminal coupled to a computer system, a computer-based kiosk, or any other device capable of communicating with a network such as the Internet 14. The access device may communicate via a network such as the Internet to access information available on a server computer 16. In one scenario, the user may want to access personal information on the server from the un-trusted public access device. Since the device is un-trusted by the user, the user may be apprehensive about typing in the user's password. In some cases, the keystrokes input by the user may be captured by a device placed in the access device by an attacker. If the keystrokes contain the user's log-in and password information for accessing the user's personal information (e.g., a bank account, a personal web page, and so on), the attacker may gain unauthorized access to the information.

To deter this from occurring, embodiments of the present invention replace or augment typical text-based password authentication mechanisms by having the user identify one or more photographs from the user's personal photograph collection. The server may comprise a photograph authentication module 18 to cause the displaying of multiple photographs to the user, to accept user responses, and to determine whether the user has correctly identified at least a threshold number of the user's personal photographs among multiple decoy photographs based on the user's responses. If the user's responses are correct, the photograph authentication module may allow access to the user's personal information stored on or accessible by the server. If any of the user's responses are incorrect, the photograph authentication module may deny access. The user's personal photograph collection may be stored in photograph database 20. The photograph database also stores many other photographs to be used as decoy photographs.

Prior to first use of the photograph authentication system, the user uploads or otherwise identifies personal photographs to be used. Since digital cameras and digital photograph collections stored on PCs are becoming widespread, the user may easily be able to select a large sample of personal photographs. As used herein, personal photographs mean photographs taken by the user (or perhaps the user's family and friends) that are stored electronically and accessible by the user. The subject of the photographs may be anything. For example, the photographs may contain images of things seen on the user's vacation, the user's family and pets, the user's belongings, and so on. As used herein, the phrase "user's photograph" means a photograph in the user's personal photograph collection, not necessarily a photograph having the user as a subject. In one embodiment, the photographs are digital photographs taken with a digital camera. Alternatively, the photographs may be images captured by a film camera that have been developed, printed, and scanned into computer system files. In one embodiment, the photograph authentication module may aggregate the photograph collections of multiple users in the photograph database in order to select photographs from the aggregate collection of multiple users to be used as decoy photographs in a given user's authentication. Alternatively, other photographs may be used as decoy photographs, as long as the photographs are not sufficiently different from the user's photographs so as to assist an attacker in distinguishing the user's photographs from the decoy photographs.

Figure 2:
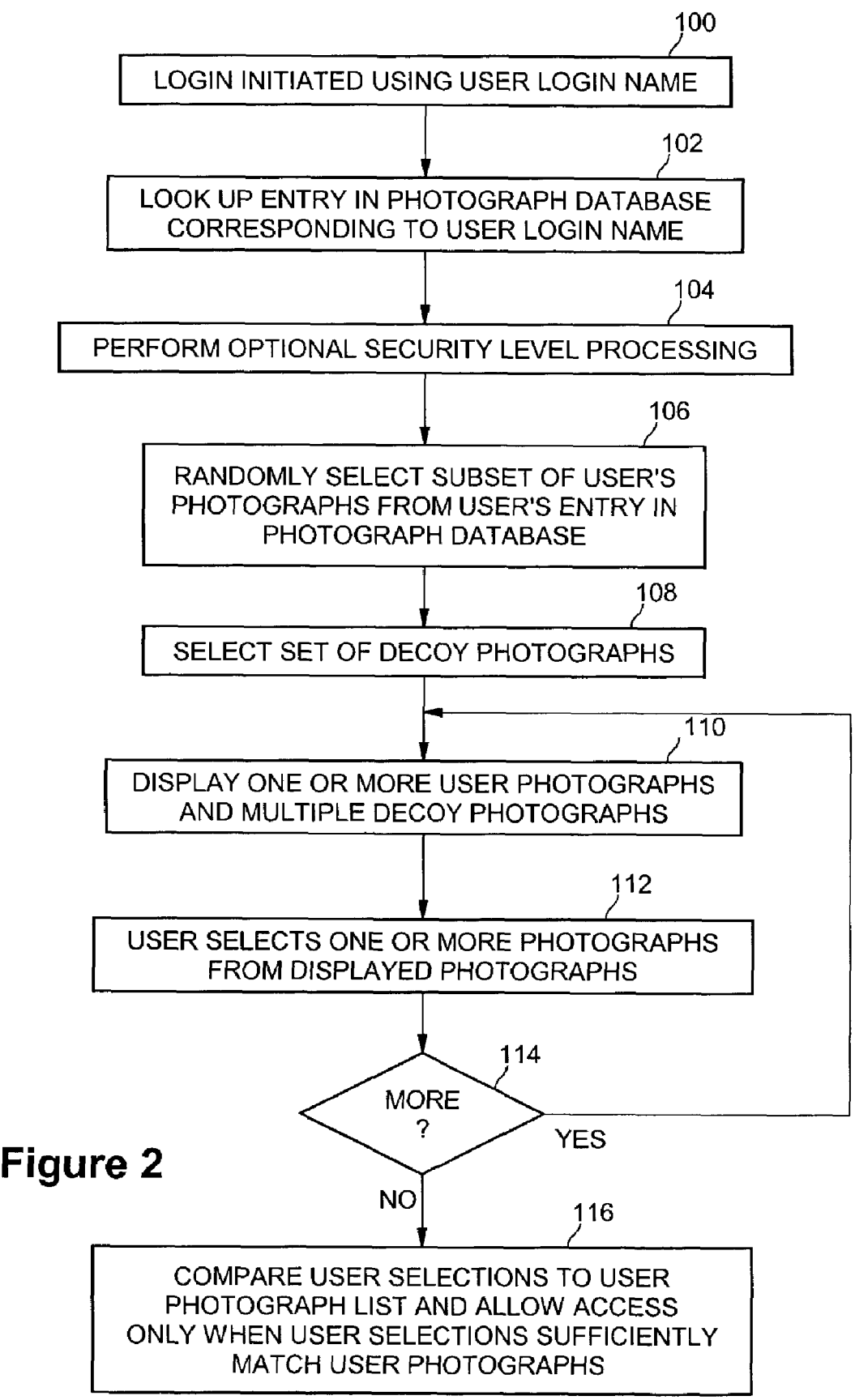
FIG. 2 is a flow diagram illustrating authentication processing according to an embodiment of the present invention.

Once the photograph database includes a wide selection of decoy photographs and user photographs, the photograph authentication system may be used. FIG. 2 is a flow diagram illustrating authentication processing according to an embodiment of the present invention. When a user attempts a login, the user may enter, using any appropriate input device or mechanism, the user's login identifier or login name (e.g., a member name, user name, and the like) into the un-trusted public access device at block 100. The device may communicate the user name to the server. The server may use the user name to locate the user's personal photograph portfolio within the photograph database by looking up the entry in photograph database 20 corresponding to the user-supplied login name at block 102. The entry may list some or all of the personal photographs familiar to the user.

At block 104, the photograph authentication module may perform one or more optional security level processing tasks. In one embodiment, the module may filter the user's personal photograph collection to delete any photographs that may be identifiable (for whatever reason) by an attacker as belonging to the user. In an embodiment, this processing may include performing known image recognition processing techniques to identify photographs that are too similar to each other. This may be done to improve the effectiveness of the challenge set by pre-processing a user's images to remove obvious similarities between pictures; specifically, well known programmatic image recognition algorithms could be applied to filter images based on color histograms or face recognition. Similar photographs may be deleted from the user's collection in the photograph database because observing multiple similar photographs in a challenge-response situation by an attacker may give a clue to the attacker that these photographs are the correct ones for the user.

In another embodiment, the access device may be identified and the display of photographs may be modified depending on the specific access device or class of access device being used. For example, in one embodiment, the Internet Protocol (IP) address of the un-trusted public access terminal may be examined by the photograph authentication module. Depending on what the IP address is, the module may raise or lower the level of security for the authentication. For example, the number of photographs shown to the user per display screen may be increased or decreased, the number of sets of photographs to be examined by the user during authentication (e.g., the number of display screens) may be increased or decreased, and the number of correct choices per display screen may be increased or decreased. In other embodiments, a browser cookie file may be examined to assist in identifying the access device.

At block 106, the photograph authentication module may randomly select a subset of the user's personal photograph portfolio to be used for the current login attempt. In some embodiments, the selection of the user's photographs may be other than random. In future attempts, a different subset may be selected in order to deter the use of replay attacks by an attacker. Since in one embodiment the user's personal photographs are chosen at random, there is no need for or mechanism in the present invention for the user to pre-select the "password" or "correct" photographs and memorize them. Instead, the user already knows the correct choices in a challenge-response scenario because he or she is already familiar with the photographs in his or her own collection. Unlike prior art systems, no user training is required.

The number of photographs in the user's personal photograph portfolio stored in the photograph database may be implementation dependent. However, having a large number of user photographs increases the security of the system. Preferably, the number of user photographs should be at least in the hundreds. At block 108, the module selects a set of other photographs from the photograph database to be used as decoy photographs. In one embodiment, the decoy photographs may be selected at random from the set of all photographs in the database other than the user's own photographs.

Figure 3:
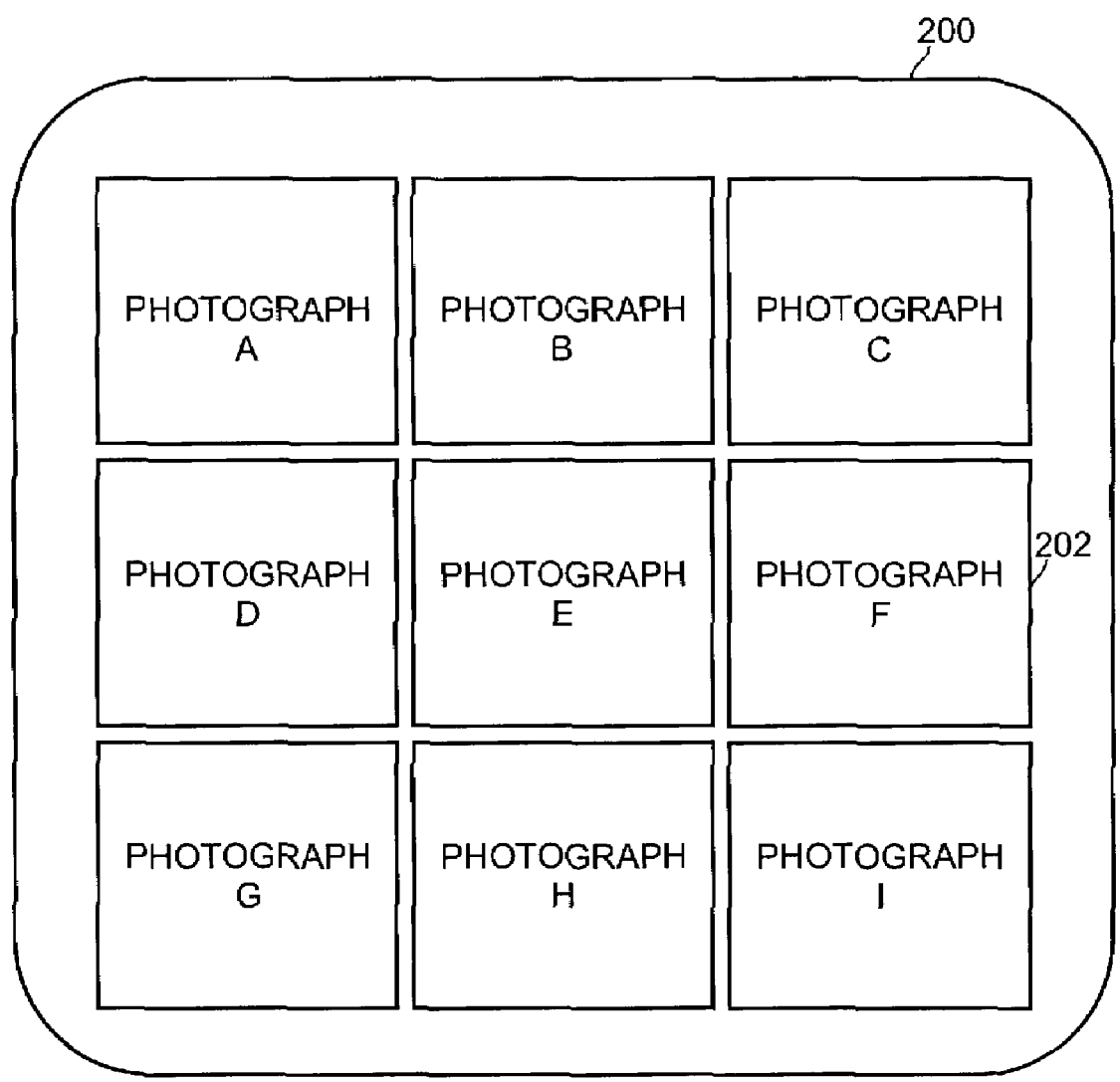
FIG. 3 is a diagram illustrating an example challenge display to a user according to an embodiment of the present invention.

At block 110, the photograph authentication module selects multiple photographs from the set of decoy photographs, and one or more photographs from the user's photograph collection, and causes the display of these photographs on the display of the un-trusted public access terminal. Preferably, the location(s) of the photograph(s) from the user's photograph collection is randomly distributed among the other, decoy photographs. FIG. 3 is a diagram illustrating an example challenge display to a user according to an embodiment of the present invention. In this example, the display 200 of the un-trusted public access terminal 12 shows nine photographs (photographs A--I). A selected one or more of the photographs, for example photograph F 202, may be the photograph(s) from the user's photograph collection, and the other photographs may be decoy photographs. Although in this example nine photographs are shown in one display screen and one of the nine photographs is from the user's photograph collection, it will be apparent to those skilled in the art that many different configurations are possible. Any number of photographs may be shown on each display screen (provided that they are not so small or indistinct so as to be unrecognizable by the user), and any subset of these photographs may be the user's photographs. Furthermore, the photograph(s) from the user's photograph collection may be randomly shown at any position within the set of photographs so as to give no hints to an attacker as to which photographs are from the user's personal photograph collection. Although the nine photographs are shown in a 3×3 grid in FIG. 3, any arrangement of photographs may be used.

At block 112, the user uses any appropriate input device (such as a mouse, trackball, selected key, etc.) to select one or more of the displayed photographs that the user recognizes as belonging to his or her own photograph collection. This selection may be conveyed to the photograph authentication module. If more display screens are to be shown to the user at block 114, the photograph authentication module selects another subset of decoy photographs and another one or more user photographs and processing continues again with block 110. In one embodiment, the subsequent display screens each display different user photographs and decoy photographs than previous display screens. If no more display screens are to be shown during this authentication session, processing continues with block 116. It will be apparent that many different numbers of display screens may be presented to the user, depending on the level of security desired and the desired amount of time required by the user to login. In one embodiment, a predetermined number of display screens are shown and processed regardless of whether the user has made mistakes in identifying photographs.

At block 116, when the desired number of display screens has been shown to the user and the user has selected his or her choices for "correct" photographs, the photograph authentication module compares the user's selections to the known subset of user photographs previously determined at block 106. The module allows access when the user selections match the user's photographs that have been displayed. If any of the user's selections have been incorrect, access may be denied. In another embodiment, the threshold for correct choices may be set to something less than 100%.

In one embodiment, the time allowed for a user to select a photograph on each display screen may be limited. This may help to deter an attack because the user typically recognizes the correct photograph very quickly, but an attacker may need to study the photographs to attempt to infer the correct choice.

In another embodiment, familiar sounds rather than familiar photographs may be used. An aural equivalent to the visually-dependant photographic authentication would make the technique feasible for blind users or for users in visually "difficult" environments. For example, snippets from a user's music collection or recordings from a user's "personal audio recorder" device might provide a collection of easily recognizable sound bites to be used. In this embodiment, the person wishing to be authenticated needs to identify one or more correct sound bites in a sequence of sound bites. The system may render a series of sound bites instead of photographs. The user listens to each sound bite and indicates, using an appropriate input device, which sound bite is the correct choice.

Photograph authentication is a technique that relies on a user's ability to easily recognize their own personal photographs for login through insecure terminals. Users can accurately, quickly, and enjoyably identify their own pictures chosen from a random set. Additionally, the present invention is sufficient to prevent casual attackers from compromising a user's login account. One embodiment of the authentication technique relies on a user's pre-existing photograph collection, used unfiltered, mixed in with decoy images to provide challenge images during authentication.

Embodiments of the present invention may be used for access to a user's casual semi-private data through un-trusted terminals. Since these terminals are fundamentally insecure, they should not be used to access sensitive information; therefore, "high-security" authentication afforded by smart cards and other mobile devices is not appropriate and is only likely to increase user frustration. The present technique is somewhat similar to graphical passwords, which are primarily intended to make the login process easier, but it has the added benefit of being resilient to replay attacks since the same sequence of images does not need to be shown each time. The system is sufficient to prevent attackers from gaining access to a user's casual data, while other high-security access techniques should be used for access to more sensitive data, perhaps through a more trusted terminal.

Unlike other authentication mechanisms, an attacker might be able to use public information, such as knowledge of a recent vacation, to help identify the appropriate pictures. However, not only does this require a lot of work on the part of the attacker, but people can recognize their own pictures quicker than an attacker, who has to think about each image, and as a result a time limit could be a defense against such attacks.

Photographic authentication is a novel technique for dealing with public infrastructure, an emerging concern as mobile and fixed-infrastructure systems continue to evolve and merge. By capitalizing on advances in consumer-grade digital photography, photographic authentication increases the confidence and spontaneity with which people can use public infrastructure by providing an appropriate authentication mechanism.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of authenticating a user operating an access device comprising:
   causing the display, on the access device, of a plurality of photographs to the user, at least one of the photographs being selected at the time of authentication from the user's personal collection of photographs and being already familiar to the user so that no prior training by the user is needed, the remaining displayed photographs being decoy photographs;
   accepting an input selection from the user identifying one of the displayed photographs; and
   allowing access when the user's selection identifies the displayed photograph from the user's personal photograph collection.

2. The method of claim 1, wherein causing the display of the photographs comprises causing the display of the photograph from the user's photograph collection at a random location on the display among the decoy photographs.

3. The method of claim 1, further comprising selecting the decoy photographs from a photograph database, the decoy photographs not including any photograph from the user's photograph collection.

4. The method of claim 3, wherein selecting the decoy photographs comprises selecting decoy photographs from photograph collections of other users, the photograph collections being stored in the photograph database.

5. The method of claim 1, further comprising causing the display of a different photograph from the user's photograph collection on a subsequent attempt at authentication by the user along with a plurality of decoy photographs.

6. The method of claim 1, further comprising repeating the causing the display and accepting steps a predetermined number of times, causing the display of a different photograph from the user's photograph collection among different decoy photographs each time, and allowing access only when the user correctly identifies at least some of the photographs from the user's photograph collection that have been displayed.

7. The method of claim 1, further comprising removing photographs from the user's photograph collection in a photograph database that are similar prior to use of the user's photograph collection for authentication.

8. The method of claim 1, further comprising limiting the time available for accepting the input selection after the photographs have been displayed.

9. The method of claim 1, further comprising:
   Identifying an access device; and
   changing at least one of: the number of photographs displayed per display screen, the number of photographs from the user's photograph collection displayed per display screen, and the number of display screens shown to the user requiring recognition of user photographs, based on the identified access device.

10. The method of claim 1, further comprising filtering photographs from the user's personal photograph collection to delete from consideration for use in authentication processing any photographs that are identifiable as belonging to the user.

11. The method of claim 9, wherein identifying the access device comprises determining the Internet Protocol (IP) address of the access device.

12. An article comprising: a storage medium having a plurality of machine readable instructions, wherein when the instructions are executed by a processor, the instructions provide for authenticating a user operating an access device by causing the display, on the access device, of a plurality of photographs to the user, at least one of the photographs being selected at the time of authentication from the user's personal collection of photographs and being already familiar to the user so that no prior training by the user is needed, the remaining displayed photographs being decoy photographs, accepting an input selection from the user identifying one of the displayed photographs, and allowing access when the user's selection identifies the displayed photograph from the user's personal photograph collection.

13. The article of claim 12, wherein instructions for causing the display of the photographs comprise instructions for causing the display of the photograph from the user's photograph collection at a random location on the display among the decoy photographs.

14. The article of claim 12, further comprising instructions for selecting the decoy photographs from a photograph database, the decoy photographs not including any photograph from the user's photograph collection.

15. The article of claim 14, wherein instructions for selecting the decoy photographs comprise instructions for selecting decoy photographs from photograph collections of other users, the photograph collections being stored in the photograph database.

16. The article of claim 12, further comprising instructions for causing the display of a different photograph from the user's photograph collection on a subsequent attempt at authentication by the user along with a plurality of decoy photographs.

17. The article of claim 12, further comprising instructions for repeating the causing the display and accepting steps a predetermined number of times, causing the display of a different photograph from the user's photograph collection among different decoy photographs each time, and allowing access only when the user correctly identifies at least some of the photographs from the user's photograph collection that have been displayed.

18. The article of claim 12, further comprising instructions for removing photographs from the user's photograph collection in a photograph database that are similar prior to use of the user's photograph collection for authentication.

19. The article of claim 12, further comprising instructions for limiting the time available for accepting the input selection after the photographs have been displayed.

20. The article of claim 12, further comprising instructions for:
   Identifying the access device; and
   changing at least one of: the number of photographs displayed per display screen, the number of photographs from the user's photograph collection displayed per display screen, and the number of display screens shown to the user requiring recognition of user photographs, based on the identified access device.

21. A system for authenticating a user of an access device comprising:
   a photograph database having a plurality of photographs from the user's personal photograph collection and a plurality of decoy photographs;
   a photograph authentication module to cause the display, on the access device, of a plurality of photographs to the user, at least one of the photographs being selected from the user's personal collection and being already familiar to the user so that no prior training by the user is needed, the remaining displayed photographs being decoy photographs, to accept an input selection from the user identifying one of the displayed photographs, and to allow access when the user's selection identifies the displayed photograph from the user's personal photograph collection, wherein the photograph authentication module selects, at the time of authentication, the photograph from the user's photograph collection to be displayed on the access device.

22. The system of claim 21, wherein the photograph authentication module causes the display of the photograph from the user's photograph collection at a random location on the display among the decoy photographs.

23. The system of claim 21, wherein the photograph authentication module selects the decoy photographs from the photograph database, the decoy photographs not including any photograph from the user's photograph collection.

24. The system of claim 23, wherein the photograph authentication module selects the decoy photographs from photograph collections in the photograph database of other users.

25. The system of claim 21, wherein the photograph authentication module causes the display of a different photograph from the user's photograph collection on a subsequent attempt at authentication by the user along with a plurality of decoy photographs.

26. The system of claim 21, further wherein the photograph authentication module removes photographs from the user's photograph collection in the photograph database that are similar prior to use of the user's photograph collection for authentication.

27. The system of claim 21, wherein the photograph authentication module limits the time available for accepting the input selection after the photographs have been displayed.

28. The system of claim 21, wherein the photograph authentication module identifies the access device; and changes at least one of: the number of photographs displayed per display screen, the number of photographs from the users photograph collection displayed per display screen, and the number of display screens shown to the user requiring recognition of user photographs, based on the identified access device.

* * * * *